(12) United States Patent
Fu et al.

(10) Patent No.: US 10,666,943 B2
(45) Date of Patent: May 26, 2020

(54) BLOCK PARTITION STRUCTURE IN VIDEO COMPRESSION

(71) Applicant: Futurewei Technologies, Inc., Plano, TX (US)

(72) Inventors: Jiali Fu, Shenzhen (CN); Shan Liu, San Jose, CA (US); Shan Gao, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/128,167

(22) Filed: Sep. 11, 2018

(65) Prior Publication Data

US 2019/0098305 A1    Mar. 28, 2019

Related U.S. Application Data

(60) Provisional application No. 62/559,410, filed on Sep. 15, 2017.

(51) Int. Cl.
| | | |
|---|---|---|
| *H04N 19/119* | (2014.01) | |
| *H04N 19/146* | (2014.01) | |
| *H04N 19/176* | (2014.01) | |
| *H04N 19/44* | (2014.01) | |
| *H04N 19/70* | (2014.01) | |

(52) U.S. Cl.
CPC ......... *H04N 19/119* (2014.11); *H04N 19/146* (2014.11); *H04N 19/176* (2014.11); *H04N 19/44* (2014.11); *H04N 19/70* (2014.11)

(58) Field of Classification Search
CPC .... H04N 19/119; H04N 19/146; H04N 19/70; H04N 19/44; H04N 19/176
See application file for complete search history.

(56) References Cited

U.S. PATENT DOCUMENTS

| | | |
|---|---|---|
| 8,526,495 B2 | 9/2013 | Liu et al. |
| 9,049,452 B2 | 6/2015 | Liu et al. |
| 9,363,511 B2 | 6/2016 | Zhang et al. |
| 9,510,012 B2 | 11/2016 | Liu et al. |
| 9,769,472 B2 | 9/2017 | Liu et al. |
| 9,788,019 B2 | 10/2017 | Liu et al. |

(Continued)

FOREIGN PATENT DOCUMENTS

CN         106063271 A    10/2016

OTHER PUBLICATIONS

"Series H: Audiovisual and Multimedia Systems, Infrastructure of audiovisual services—Coding of moving video, High efficiency video coding," ITU-T, H.265, Dec. 2016, 664 pages.

(Continued)

*Primary Examiner* — Neil R Mikeska
(74) *Attorney, Agent, or Firm* — Conley Rose, P.C.

(57) ABSTRACT

A method of coding implemented by a decoding device. The method includes receiving a bitstream from an encoding device, the bitstream containing a minimum block width and a minimum block height, partitioning a current block into sub-blocks until one of the sub-blocks reaches the minimum block width or the minimum block height, determining pixel values for the one of the sub-blocks that has reached the minimum block width or the minimum block height, and displaying, on a display of an electronic device, an image generated using the pixel values that were determined.

16 Claims, 9 Drawing Sheets

(56) References Cited

U.S. PATENT DOCUMENTS

| | | | |
|---|---|---|---|
| 9,813,726 | B2 | 11/2017 | Liu et al. |
| 2012/0039388 | A1 | 2/2012 | Kim et al. |
| 2013/0208792 | A1* | 8/2013 | He .................. H04N 19/105 |
| | | | 375/240.12 |
| 2014/0022343 | A1* | 1/2014 | Chen .................. H04N 19/70 |
| | | | 348/43 |
| 2014/0086323 | A1 | 3/2014 | Chuang et al. |
| 2014/0140404 | A1* | 5/2014 | Liu .................. H04N 19/105 |
| | | | 375/240.12 |
| 2014/0321543 | A1 | 10/2014 | Kim et al. |
| 2015/0172719 | A1 | 6/2015 | Guo et al. |
| 2015/0365692 | A1 | 12/2015 | Liu et al. |
| 2016/0142706 | A1 | 5/2016 | Chuang et al. |
| 2016/0309156 | A1 | 10/2016 | Park et al. |
| 2017/0188028 | A1 | 6/2017 | Park et al. |
| 2017/0272745 | A1 | 9/2017 | Liu et al. |
| 2017/0272750 | A1* | 9/2017 | An .................. H04N 19/147 |
| 2017/0353730 | A1 | 12/2017 | Liu et al. |
| 2017/0374369 | A1* | 12/2017 | Chuang .............. H04N 19/44 |
| 2018/0070110 | A1* | 3/2018 | Chuang .............. H04N 19/96 |
| 2018/0091810 | A1* | 3/2018 | Son .................. H04N 19/105 |
| 2018/0139444 | A1* | 5/2018 | Huang .............. H04N 19/119 |
| 2019/0273923 | A1* | 9/2019 | Huang .............. H04N 19/124 |

OTHER PUBLICATIONS

Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.

Liu, S., et al., "Hybrid global-local motion compensated frame interpolation for low bit rate video coding," J. Vis. Commun. Image R., vol. 14, 2003, pp. 61-79.

Liu, S., et al., "Global/Local Motion-Compensated Frame Interpolation for Low Bitrate Video," Image and Video Communications and Processing, vol. 3974, 2000, 12 pages.

Liu, S., et al., "Non-linear Motion-compensated Interpolation for Low Bit Rate Video," Applications of Digital Image Processing XXIII, vol. 4115, 2000, 11 pages.

Liu, S., et al., "MCI-embedded Motion Compensated Prediction for Quality Enhancement of Frame Interpolation," Multimedia Systems and Applications III, vol. 4209, Mar. 2001, 11 pages.

Liu, S., et al., "Joint Temporal-Spatial Rate Control with Approximating Rate-Distortion Models," Conference on Visual Communications and Image Processing, Jan. 20-25, 2002, 10 pages.

Liu, S., et al., Complexity Reduction of Joint Temporal-Spatial Bit Allocation Using R-D Models for Video Streaming, IEEE International Conference on Image Processing, Sep. 22-25, 2002, pp. 729-732.

Liu, S., et al., "Efficient MPEG-2 to MPEG-4 Video Transcoding," Conference on Image and Video Communications and Processing, Jan. 20-24, 2003, pp. 186-195.

Lou, J., et al., "Complexity and memory efficient GOP structures supporting VCR functionalities in H. 264/AVC," IEEE International Symposium on Circuits and Systems, 2008, pp. 636-639.

Lou, J., et al., "Trick-Play Optimization for H.264 Video Decoding," Journal of Information Hiding and Multimedia Signal Processing, TR2010-076, Sep. 2010, 15 pages.

Liu, S., et al., "Joint Temporal-Spatial Rate Control for Adaptive Video Transcoding," IEEE International Conference on Multimedia and Expo, Jul. 6-9, 2003, 4 pages.

Zhang, X., et al., "Intra Mode Coding in HEVC Standard," Visual Communications and Image Processing, Jan. 2012, 6 pages.

Liu, S., et al., "Rectangular Partitioning for Intra Prediction in HEVC," Visual Communications and Image Processing, Jan. 2012, 6 pages.

Lai, P., et al., "Combined Temporal and Inter-layer Prediction for Scalable Video Coding using HEVC," Picture Coding Symposium, 2013, pp. 117-120.

Liu, S., et al., "Remove Partition Size NxN," JCTVC-D432, Jan. 20-28, 2011, 7 pages.

Liu, S., et al., "Evaluations and suggestions for TU representation," JCTVC-E083, WG11 No. m19597, Mar. 16-23, 2011, 8 pages.

Zhang, X., et al., "Method for deriving Chroma QP from Luma QP," JCTVC-F277, Jul. 14-22, 2011, 6 pages.

Liu, S., et al., "Rectangular (2NxN and Nx2N) Intra Prediction," JCTVC-G135, WG11 No. 21687, Nov. 21-30, 2011, 6 pages.

Zhang, X., et al., "Method and syntax for quantization matrices representation," JCTVC-G152, Nov. 21-30, 2011, 8 pages.

Liu, S., et al., "Support of ChromaQPOffset in HEVC," JCTVC-G509r1, Nov. 21-30, 2011, 8 pages.

Oudin, S., et al., "Harmonization of the prediction and partitioning mode binarization of P and B slices," JCTVC-G1042, Nov. 21-30, 2011, 4 pages.

Cao, X., et al., "AHG16 Unification of SDIP and NSQT," JCTVC-H0347, Feb. 1-10, 2012, 9 pages.

Zhang, X., et al., "Non-CE6: Intra mode coding with fixed length binarization," JCTVC-H0435, WG11 No. m23311, Feb. 1-10, 2012, 5 pages.

Kim, J., et al., "nonTE5: Assigning intra prediction mode to inter layer intra predicted blocks in enhance layer," JCTVC-L0239, Jan. 14-23, 2013, 5 pages.

Lai, P., et al., "SCE3.4 Generalized Combined Prediction," JCTVC-M0221, Apr. 18-26, 2013, 9 pages.

Lai, P., et al., "Non-SCE3.4: Simplified Generalized Combined Prediction," JCTVC-M0222, Apr. 2013, 10 pages.

Lai, P., et al., "Non-SCE3.4: Simplified Generalized Combined Prediction," JCTVC-M0222_r1, Apr. 18-26, 2013, 9 pages.

Seregin, V., et al., "Uni-prediction for combined inter mode," JCTVC-M0445, Apr. 18-26, 2013, 11 pages.

Xu, X., et al., "On unification of intra block copy and inter-picture motion compensation," JCTVC-Q0132, Jan. 9-17, 2014, 14 pages.

Xu, X., et al., "Non-CE2: Intra BC merge mode with default candidates," JCTVC-S0123, Oct. 17-24, 2014, 7 pages.

Xu, X., et al., "CE2 Test 3.2: Intra BC merge mode with default candidates," JCTVC-T0073, Feb. 10-18, 2015, 6 pages.

Sullivan, et al., "Overview of the High Efficiency Video Coding (HEVC) Standard," IEEE Transactions on Circuits and Systems for Video Technology, vol. 22, No. 12, Dec. 2012, pp. 1649-1668.

MediaTek, Inc., "Block Partitioning Structure for Next Generation Video Coding," ITUT, Study Group 16—Contribution 966 R3, Com 16-C966 R3-E, Sep. 2015, 8 pages.

Li, et al., "Multi-Type-Tree," Document JVET-D0117r1, Joint Video Exploration Team (JVET) of ITU-T SG 16 WP 3 and ISO/IEC JTC 1/SC 29/WG 11, 4th Meeting: Chengdu, CN, Oct. 15-21, 2016, 3 pages.

Foreign Communication From a Counterpart Application, PCT Application No. PCT/CN2018/105361, English Translation of International Search Report dated Dec. 17, 2018, 5 pages.

Foreign Communication From a Counterpart Application, PCT Application No. PCT/CN2018/105361, English Translation of Written Opinion dated Dec. 17, 2018, 4 pages.

* cited by examiner (A) quad-tree partitioning (B) vertical binary-tree partitioning (C) horizontal binary-tree partitioning (D) vertical center-side triple-tree partitioning (E) horizontal center-side triple-tree partitioning

BLOCK PARTITION STRUCTURE IN VIDEO COMPRESSION

CROSS-REFERENCE TO RELATED APPLICATIONS

This patent application claims the benefit of U.S. Provisional Patent Application No. 62/559,410, filed Sep. 15, 2017, by Jiali Fu, et al., and titled "Block Partition Structure In Video Compression," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method of coding implemented by a coding device. The method includes a method of coding implemented by a decoding device. The method includes receiving, by the decoding device, a bitstream from an encoding device, the bitstream containing a minimum block width and a minimum block height; partitioning, by the decoding device, a current block into sub-blocks until one of the sub-blocks reaches the minimum block width or the minimum block height; determining, by the decoding device, pixel values for the one of the sub-blocks that has reached the minimum block width or the minimum block height; and displaying, on a display of an electronic device, an image generated using the pixel values that were determined.

Optionally, in any of the preceding aspects, another implementation of the aspect provides that the minimum block width is different than the minimum block height. Optionally, in any of the preceding aspects, another implementation of the aspect provides that the one of the sub-blocks has a rectangular shape. Optionally, in any of the preceding aspects, another implementation of the aspect provides that the minimum block width specifies a minimum width for a luma coding block and the minimum block height specifies a minimum height for the luma coding block. Optionally, in any of the preceding aspects, another implementation of the aspect provides that the minimum block width is represented as log 2_min_luma_coding_block_width_minus3, and the minimum block height is represented as log 2_min_luma_coding_block_height_minus3.

In an embodiment, the disclosure includes a method of coding implemented by a decoding device. The method includes receiving, by the decoding device, a bitstream from an encoding device. The bitstream contains a minimum block width or a minimum block height, and a difference between the minimum block width and the minimum block height. The method also includes determining, by the decoding device, the minimum block height using the difference and the minimum block width, or the minimum block width using the difference and the minimum block height; partitioning, by the decoding device, a current block into sub-blocks until one of the sub-blocks reaches the minimum block width or the minimum block height; determining, by the decoding device, pixel values for the one of the sub-blocks that has reached the minimum block width or the minimum block height; and displaying, on a display of an electronic device, an image generated using the pixel values that were determined.

Optionally, in any of the preceding aspects, another implementation of the aspect provides that the minimum block width and the minimum block height each have different values. Optionally, in any of the preceding aspects, another implementation of the aspect provides that the one of the sub-blocks has a rectangular shape. Optionally, in any of the preceding aspects, another implementation of the aspect provides that the minimum block width specifies a minimum width for a luma coding block and the minimum block height specifies a minimum height for the luma coding block. Optionally, in any of the preceding aspects, another implementation of the aspect provides that the difference between the minimum block width and the minimum block height is represented by log 2_diff_min_luma_coding_block_width_height. Optionally, in any of the preceding aspects, another implementation of the aspect provides that the minimum block width is represented as log 2_min_luma_coding_block_width_minus3, and the minimum block height is represented as log 2_min_luma_coding_block_height_minus3.

In an embodiment, the disclosure includes a decoding device. The decoding device includes a receiver configured to receive a bitstream. The bitstream contains a minimum block width or a minimum block height, and a minimum block area. The decoding device also includes a memory coupled to the receiver, the memory storing instructions; and a processor coupled to the memory. The processor is configured to execute the instructions stored in the memory to cause the processor to determine the minimum block height from the minimum block area and the minimum block width, or the minimum block width from the minimum block area and the minimum block height; partition a current block into sub-blocks until one of the sub-blocks reaches the minimum block width or the minimum block height; and determine pixel values for the one of the sub-blocks that has reached the minimum block width or the minimum block height. The decoding device also includes a display coupled to the processor. The display is configured to display an image generated using the pixel values that were determined.

Optionally, in any of the preceding aspects, another implementation of the aspect provides that the minimum block width and the minimum block height each have different values. Optionally, in any of the preceding aspects, another implementation of the aspect provides that the one of the sub-blocks has a rectangular shape. Optionally, in any of the preceding aspects, another implementation of the aspect provides that the minimum block area is represented by log 2_diff_min_area_luma_coding_block_size. Optionally, in any of the preceding aspects, another implementation of the aspect provides that the minimum block width is represented as log 2_min_luma_coding_block_width_minus3, and the minimum block height is represented as log 2_min_luma_coding_block_height_minus3.

In an embodiment, the disclosure includes a decoding device. The decoding device includes a receiver configured to receive a bitstream. The bitstream contains a minimum block width or a minimum block height, and a width-height ratio. The decoding device also includes a memory coupled to the receiver, the memory storing instructions, and a processor coupled to the memory. The processor is configured to execute the instructions stored in the memory to cause the processor to determine the minimum block height from the width-height ratio and the minimum block width, or the minimum block width from the width-height ratio and the minimum block height; partition a current block into sub-blocks until one of the sub-blocks reaches the minimum block width or the minimum block height; and determine pixel values for the one of the sub-blocks that has reached the minimum block width or the minimum block height. The decoding device also includes a display coupled to the processor. The display is configured to display an image generated using the pixel values that were determined.

Optionally, in any of the preceding aspects, another implementation of the aspect provides that the minimum block width and the minimum block height each have different values. Optionally, in any of the preceding aspects, another implementation of the aspect provides that the one of the sub-blocks has a rectangular shape. Optionally, in any of the preceding aspects, another implementation of the aspect provides that the width-height ratio is represented by log 2_diff_min_ratio_luma_coding_block_width_height.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The standard now known as High Efficiency Video Coding (HEVC) is an advanced video coding system developed under the Joint Collaborative Team on Video Coding (JCT-VC) group of video coding experts from the International Telecommunication Union-Telecommunication Standardization Sector (ITU-T) Study Group. Details regarding the HEVC standard are found in ITU-T Rec. H.265 and International Organization for Standardization (ISO)/International Electrotechnical Commission (IEC) 23008-2 (2013), High efficiency video coding, final draft approval January 2013 (formally published by ITU-T in June, 2013, and in ISO/IEC in November 2013), which is incorporated herein by reference. An overview of HEVC is found in G. J. Sullivan, J.-R. Ohm, W.-J. Han, and T. Wiegand, "Overview of the High Efficiency Video Coding (HEVC) Standard", IEEE Trans. Circuits and Systems for Video Technology, Vol. 22, No. 12, pp. 1649-1668, December 2012, which is incorporated herein by reference.

Figure 1:
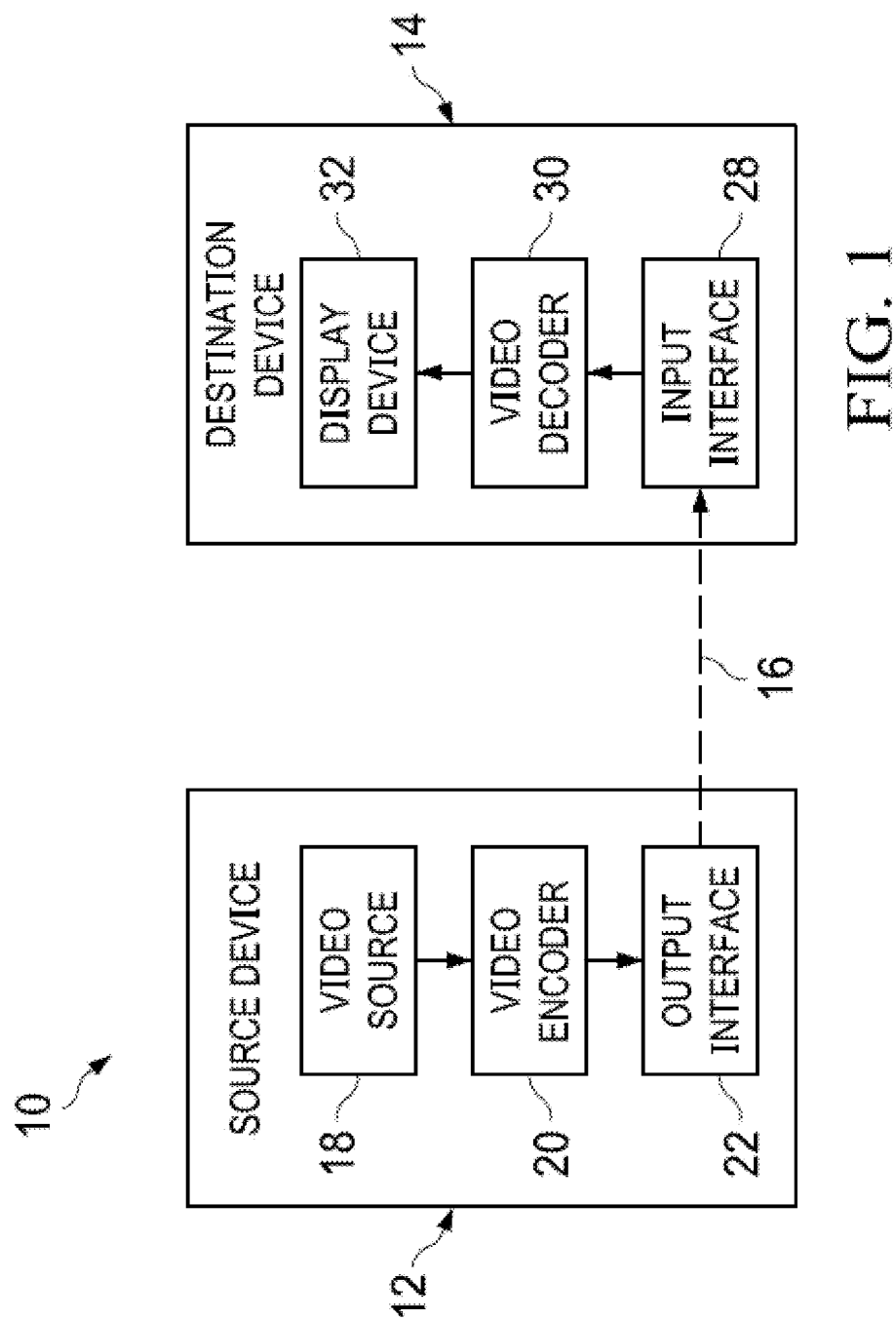
FIG. 1 is a block diagram illustrating an example coding system that may utilize bi-lateral prediction techniques.

FIG. 1 is a block diagram illustrating an example video encoding and decoding system 10 that may utilize techniques for encoding/decoding digital video data using a large block, i.e., a block that contains more pixels than a 16×16 block. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which concern use of a large block comprising more pixels than blocks prescribed by conventional video encoding standards, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 may include a video source 18, video encoder 20, a modulator/demodulator (modem) 22, and a transmitter 24. Destination device 14 may include a receiver 26, a modem 28, a video decoder 30, and a display device 32. In accordance with this disclosure, video encoder 20 of source device 12 may be configured to apply one or more of the techniques for using, in a video encoding process, a large block having a size that is larger than a block size prescribed by conventional video encoding standards. Similarly, video decoder 30 of destination device 14 may be configured to apply one or more of the techniques for using, in a video decoding process, a block size that is larger than a block size prescribed by conventional video encoding standards.

The illustrated system 10 of FIG. 1 is merely one example. Techniques for using a large block as described in this disclosure may be performed by any digital video encoding and/or decoding device. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to use a large block, e.g., larger than 16×16, for inter (i.e., temporal) and/or intra (i.e., spatial) encoding of video data. The video decoding process performed by video decoder 30 may also use such techniques during the decoding process. The information communicated over channel 16 may include syntax information defined by video encoder 20, which is also used by video decoder 30, that includes syntax elements that describe characteristics and/or processing of the large blocks, as discussed in greater detail below. The syntax information may be included in any or all of a frame header, a slice header, a sequence header (for example, with respect to H.264, by using profile and level to which the coded video sequence conforms), or a block header. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively described as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. Video encoder 20 operates on video blocks within individual video frames in order to encode the video data. A video block may correspond to a block or a partition of a block. A video block may further correspond to a partition of a partition. The video blocks may have fixed or varying sizes, and may differ in size according to a specified coding standard or in accordance with the techniques of this disclosure. Each video frame may include a plurality of slices. Each slice may include a plurality of blocks, which may be arranged into partitions, also referred to as sub-blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "x" and "y" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction and 16 pixels in a horizontal direction. Likewise, an N×N block generally has N pixels in a vertical direction and N pixels in a horizontal direction, where N represents a positive integer value that may be greater than 16. The pixels in a block may be arranged in rows and columns.

Block sizes that are less than 16 by 16 may be referred to as partitions of a 16 by 16 block. Likewise, for an N×N block, block sizes less than N×N may be referred to as partitions of the N×N block. The techniques of this disclosure describe intra- and inter-coding for blocks larger than the conventional 16×16 pixel block, such as 32×32 pixel blocks, 64×64 pixel blocks, or larger blocks. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, blocks and the various partitions, sometimes referred to as sub-blocks, may be considered to be video blocks. In addition, a slice may be considered to be a plurality of video blocks, such as blocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, block type, coding mode, maximum block size for a coded unit (such as a frame, slice, block, or sequence), or the like.

According to various techniques of this disclosure, video encoder 20 may use a block that is larger than that prescribed by conventional video encoding standards to encode digital video data. In one example, video encoder 20 may encode, with a video encoder, a video block having a size of more than 16×16 pixels, generate block-type syntax information that indicates the size of the block, and generate a CBP value for the encoded block, wherein the coded block pattern value indicates whether the encoded block includes at least one non-zero coefficient. The block block-type syntax information may be provided in a block header for the large block. The block block-type syntax information may indicate an address or position of the block in a frame or slice, or a block number that identifies the position of the block, a type of coding mode applied to the block, a quantization value for the block, any motion vector information for the block, and a CBP value for the block.

In another example, video encoder 20 may receive a video block having a size of more than 16×16 pixels, partitioning the block into partitions, encode one of the partitions using a first encoding mode, encode another of the partitions using a second encoding mode different from the first encoding mode, and generate block-type syntax information that indicates the size of the block and identifies the partitions and the encoding modes used to encode the partitions.

In an additional example, video encoder 20 may receive a video coding unit, such as a frame or slice, determine a first rate-distortion metric for encoding the video coding unit using first video blocks with sizes of 16×16 pixels, determine a second rate-distortion metric for encoding the video coding unit using second video blocks with sizes of more than 16×16 pixels, encode the video coding unit using the first video blocks when the first rate-distortion metric is less than second rate-distortion metric, and encode the video coding unit using the second video blocks when the second rate-distortion metric is less than the first rate-distortion metric.

In one example, video decoder 30 may receive an encoded video block having a size of more than 16×16 pixels, receive block-type syntax information that indicates the size of the encoded block, receive a coded block pattern value for the encoded block, wherein the coded block pattern value indicates whether the encoded block includes at least one non-zero coefficient, and decode the encoded block based on the block-type syntax information and the coded block pattern value for the encoded block.

In another example, video decoder 30 may receive a video block having a size of more than 16×16 pixels, wherein the block is partitioned into partitions, one of the partitions is intra-encoded and another of the partitions is intra-encoded, receive block-type syntax information that indicates the size of the block and identifies the partitions and the encoding modes used to encode the partitions, and decode the video block based on the block-type syntax information.

Figure 2:
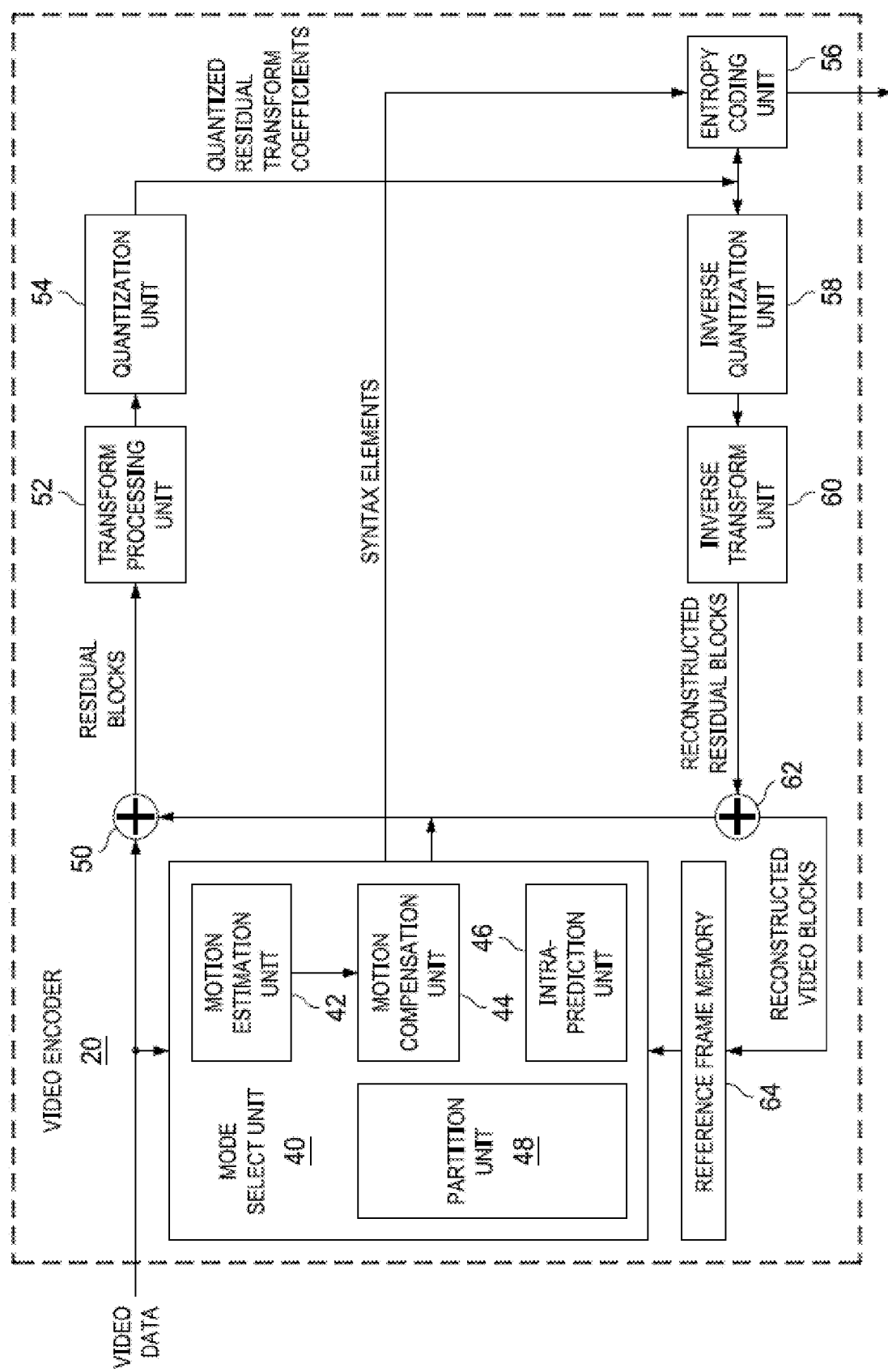
FIG. 2 is a block diagram illustrating an example video encoder that may implement bi-lateral prediction techniques.

FIG. 2 is a block diagram illustrating an example of a video encoder 50 that may implement techniques for using a large block consistent with this disclosure. Video encoder 50 may correspond to video encoder 20 of source device 12, or a video encoder of a different device. Video encoder 50 may perform intra- and inter-coding of blocks within video frames, including large blocks, or partitions or sub-partitions of large blocks. Intra-coding relies on spatial prediction to reduce or remove spatial redundancy in video within a given video frame. Inter-coding relies on temporal prediction to reduce or remove temporal redundancy in video within adjacent frames of a video sequence.

Intra-mode (I-mode) may refer to any of several spatial based compression modes and inter-modes such as prediction (P-mode) or bi-directional (B-mode) may refer to any of several temporal-based compression modes. The techniques of this disclosure may be applied both during inter-coding and intra-coding. In some cases, techniques of this disclosure may also be applied to encoding non-video digital pictures. That is, a digital still picture encoder may utilize the techniques of this disclosure to intra-code a digital still picture using large blocks in a manner similar to encoding intra-coded blocks in video frames in a video sequence.

As shown in FIG. 2, video encoder 50 receives a current video block within a video frame to be encoded. In the example of FIG. 2, video encoder 50 includes motion compensation unit 35, motion estimation unit 36, intra-prediction unit 37, mode select unit 39, reference frame store 34, summer 48, transform unit 38, quantization unit 40, and entropy coding unit 46. For video block reconstruction, video encoder 50 also includes inverse quantization unit 42, inverse transform unit 44, and summer 51. A deblocking filter (not shown in FIG. 2) may also be included to filter block boundaries to remove blockiness artifacts from reconstructed video. If desired, the deblocking filter would typically filter the output of summer 51.

During the encoding process, video encoder 50 receives a video frame or slice to be coded. The frame or slice may be divided into multiple video blocks, including large blocks. Motion estimation unit 36 and motion compensation unit 35 perform inter-predictive coding of the received video block relative to one or more blocks in one or more reference frames to provide temporal compression. Intra-prediction unit 37 performs intra-predictive coding of the received video block relative to one or more neighboring blocks in the same frame or slice as the block to be coded to provide spatial compression.

Mode select unit 39 may select one of the coding modes, intra- or inter-, e.g., based on error results, and provides the resulting intra- or inter-coded block to summer 48 to generate residual block data and to summer 51 to reconstruct the encoded block for use as a reference frame. In accordance with the techniques of this disclosure, the video block to be coded may comprise a block that is larger than that prescribed by conventional coding standards, i.e., larger than a 16×16 pixel block. For example, the large video block may comprise a 64×64 pixel block or a 32×32 pixel block.

Motion estimation unit 36 and motion compensation unit 35 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics.

A motion vector may also indicate displacement of a partition of a large block. In one example with respect to a 64×64 pixel block with a 32×64 partition and two 32×32 partitions, a first motion vector may indicate displacement of the 32×64 partition, a second motion vector may indicate displacement of a first one of the 32×32 partitions, and a third motion vector may indicate displacement of a second one of the 32×32 partitions, all relative to corresponding partitions in a reference frame. Such partitions may also be considered video blocks, as those terms are used in this disclosure. Motion compensation may involve fetching or generating the predictive block based on the motion vector determined by motion estimation. Again, motion estimation unit 36 and motion compensation unit 35 may be functionally integrated.

Motion estimation unit 36 calculates a motion vector for the video block of an inter-coded frame by comparing the video block to video blocks of a reference frame in reference frame store 34. Motion compensation unit 35 may also interpolate sub-integer pixels of the reference frame, e.g., an I-frame or a P-frame. The ITU H.264 standard refers to reference frames as "lists." Therefore, data stored in reference frame store 34 may also be considered lists. Motion estimation unit 36 compares blocks of one or more reference frames (or lists) from reference frame store 34 to a block to be encoded of a current frame, e.g., a P-frame or a B-frame. When the reference frames in reference frame store 34 include values for sub-integer pixels, a motion vector calculated by motion estimation unit 36 may refer to a sub-integer pixel location of a reference frame. Motion estimation unit 36 sends the calculated motion vector to entropy coding unit 46 and motion compensation unit 35. The reference frame block identified by a motion vector may be referred to as a predictive block. Motion compensation unit 35 calculates error values for the predictive block of the reference frame.

Motion compensation unit 35 may calculate prediction data based on the predictive block. Video encoder 50 forms a residual video block by subtracting the prediction data from motion compensation unit 35 from the original video block being coded. Summer 48 represents the component or components that perform this subtraction operation. Transform unit 38 applies a transform, such as a discrete cosine transform (DCT) or a conceptually similar transform, to the residual block, producing a video block comprising residual transform coefficient values. Transform unit 38 may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel value domain to a transform domain, such as a frequency domain.

Quantization unit 40 quantizes the residual transform coefficients to further reduce bit rate. The quantization process may reduce the bit depth associated with some or all of the coefficients. In one example, quantization unit 40 may establish a different degree of quantization for each 64×64 pixel block according to a luminance quantization parameter, referred to in this disclosure as QPY. Quantization unit 40 may further modify the luminance quantization parameter used during quantization of a 64×64 block based on a quantization parameter modifier, referred to herein as "MB64_delta_QP," and a previously encoded 64×64 pixel block.

Each 64×64 pixel large block may comprise an individual MB64_delta_QP value, in the range between −26 and +25, inclusive. In general, video encoder 50 may establish the MB64_delta_QP value for a particular block based on a desired bitrate for transmitting the encoded version of the block. The MB64_delta_QP value of a first 64×64 pixel block may be equal to the QP value of a frame or slice that includes the first 64×64 pixel block, e.g., in the frame/slice header. QPY for a current 64×64 pixel block may be calculated according to the formula:

$$QP\ Y=(QP\ Y,\text{PREV}+MB64\_delta\_QP+52)\%52$$

where QPY,PREV refers to the QPY value of the previous 64×64 pixel block in the decoding order of the current slice/frame, and where "%" refers to the modulo operator such that N %52 returns a result between 0 and 51, inclusive, corresponding to the remainder value of N divided by 52. For a first block in a frame/slice, QPY,PREV may be set equal to the frame/slice QP sent in the frame/slice header.

In one example, quantization unit 40 presumes that the MB64_delta_QP value is equal to zero when a MB64_delta_QP value is not defined for a particular 64×64 pixel block, including "skip" type blocks, such as P_Skip and B_Skip block types. In some examples, additional delta_QP values (generally referred to as quantization parameter modification values) may be defined for finer grain quantization control of partitions within a 64×64 pixel block, such as MB32_delta_QP values for each 32×32 pixel partition of a 64×64 pixel block. In some examples, each partition of a 64×64 block may be assigned an individual quantization parameter. Using an individualized quantization parameter for each partition may result in more efficient quantization of a block, e.g., to better adjust quantization for a non-homogeneous area, instead of using a single QP for a 64×64 block. Each quantization parameter modification value may be included as syntax information with the corresponding encoded block, and a decoder may decode the encoded block by dequantizing, i.e., inverse quantizing, the encoded block according to the quantization parameter modification value.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding technique. Following the entropy coding by entropy coding unit 46, the encoded video may be transmitted to another device or archived for later transmission or retrieval. The coded bitstream may include entropy coded residual transform coefficient blocks, motion vectors for such blocks, MB64_delta_QP values for each 64×64 pixel block, and other syntax elements including, for example, block-type identifier values, coded unit headers indicating the maximum size of blocks in the coded unit, QPY values, coded block pattern (CBP) values, values that identify a partitioning method of a block or sub-block, and transform size flag values, as discussed in greater detail below. In the case of context adaptive binary arithmetic coding, context may be based on neighboring blocks.

In some cases, entropy coding unit 46 or another unit of video encoder 50 may be configured to perform other coding functions, in addition to entropy coding. For example, entropy coding unit 46 may be configured to determine the CBP values for the large blocks and partitions. Entropy coding unit 46 may apply a hierarchical CBP scheme to provide a CBP value for a large block that indicates whether any partitions in the block include non-zero transform coefficient values and, if so, other CBP values to indicate whether particular partitions within the large block have non-zero transform coefficient values. Also, in some cases, entropy coding unit 46 may perform run length coding of the coefficients in a large block or subpartition. In particular, entropy coding unit 46 may apply a zig-zag scan or other scan pattern to scan the transform coefficients in a block or partition and encode runs of zeros for further compression. Entropy coding unit 46 also may construct header information with appropriate syntax elements for transmission in the encoded video bitstream.

Inverse quantization unit 42 and inverse transform unit 44 apply inverse quantization and inverse transformation, respectively, to reconstruct the residual block in the pixel domain, e.g., for later use as a reference block. Motion compensation unit 35 may calculate a reference block by adding the residual block to a predictive block of one of the frames of reference frame store 34. Motion compensation unit 35 may also apply one or more interpolation filters to the reconstructed residual block to calculate sub-integer pixel values. Summer 51 adds the reconstructed residual block to the motion compensated prediction block produced by motion compensation unit 35 to produce a reconstructed video block for storage in reference frame store 34. The reconstructed video block may be used by motion estimation unit 36 and motion compensation unit 35 as a reference block to inter-code a block in a subsequent video frame. The large block may comprise a 64×64 pixel block, a 32×32 pixel block, or other block that is larger than the size prescribed by conventional video coding standards.

Figure 3:
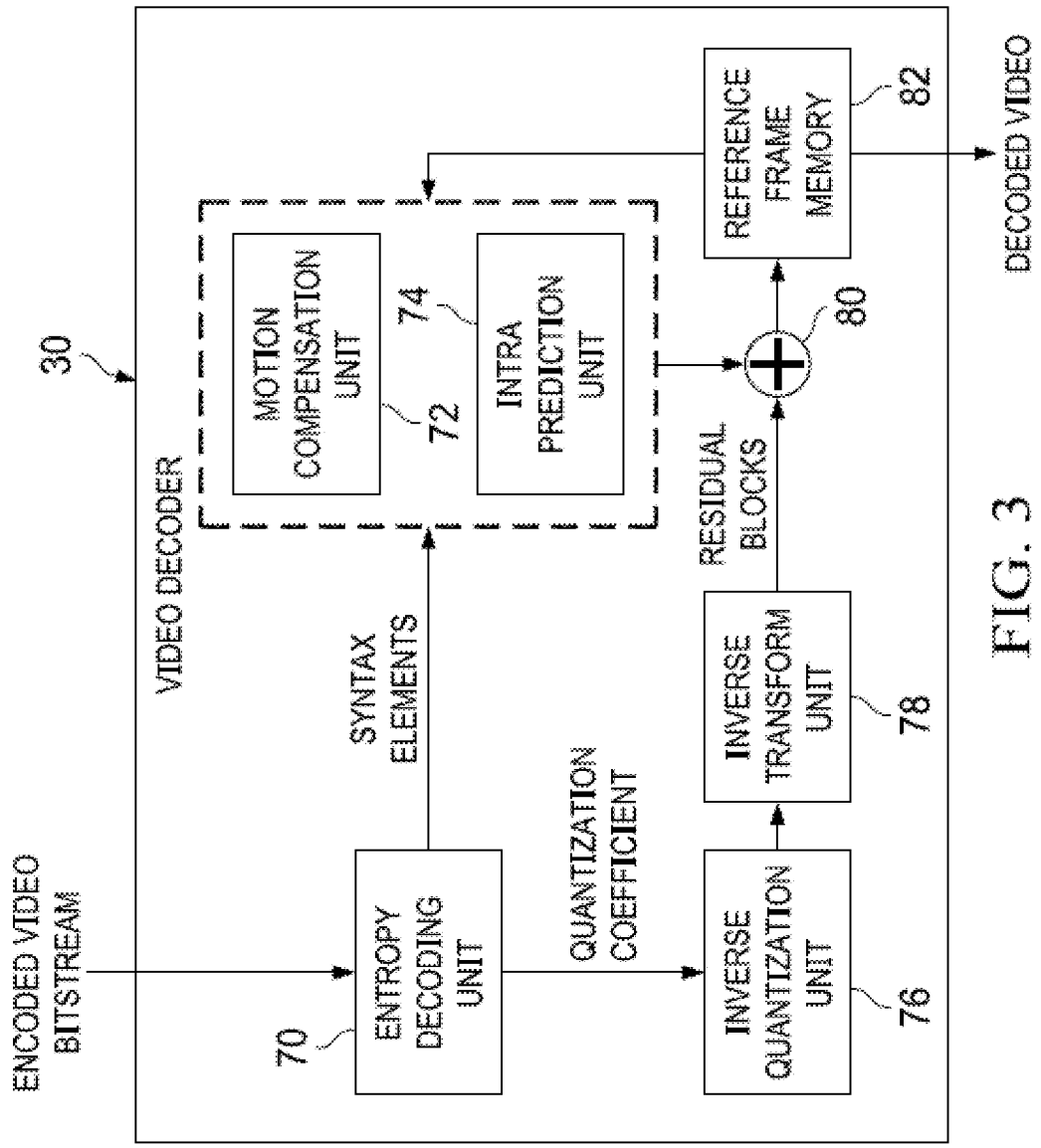
FIG. 3 is a block diagram illustrating an example of a video decoder that may implement bi-lateral prediction techniques.

FIG. 3 is a block diagram illustrating an example of a video decoder 60, which decodes a video sequence that is encoded in the manner described in this disclosure. The encoded video sequence may include encoded blocks that are larger than the size prescribed by conventional video encoding standards. For example, the encoded blocks may be 32×32 pixel or 64×64 pixel blocks. In the example of FIG. 3, video decoder 60 includes an entropy decoding unit 52, motion compensation unit 54, intra-prediction unit 55, inverse quantization unit 56, inverse transformation unit 58, reference frame store 62, and summer 64. Video decoder 60 may, in some examples, perform a decoding pass generally reciprocal to the encoding pass described with respect to video encoder 50 (FIG. 2). Motion compensation unit 54 may generate prediction data based on motion vectors received from entropy decoding unit 52.

Entropy decoding unit 52 entropy-decodes the received bitstream to generate quantized coefficients and syntax elements (e.g., motion vectors, CBP values, QPY values, transform size flag values, MB64_delta_QP values). Entropy decoding unit 52 may parse the bitstream to identify syntax information in coded units such as frames, slices, and/or block headers. Syntax information for a coded unit comprising a plurality of blocks may indicate the maximum size of the blocks, e.g., 16×16 pixels, 32×32 pixels, 64×64 pixels, or other larger sized blocks in the coded unit. The syntax information for a block is forwarded from entropy coding unit 52 to either motion compensation unit 54 or intra-prediction unit 55, e.g., depending on the coding mode of the block. A decoder may use the maximum size indicator in the syntax of a coded unit to select a syntax decoder for the coded unit. Using the syntax decoder specified for the maximum size, the decoder can then properly interpret and process the large-sized blocks include in the coded unit.

Motion compensation unit 54 may use motion vectors received in the bitstream to identify a prediction block in reference frames in reference frame store 62. Intra-prediction unit 55 may use intra-prediction modes received in the bitstream to form a prediction block from spatially adjacent blocks. Inverse quantization unit 56 inverse quantizes, i.e., de-quantizes, the quantized block coefficients provided in the bitstream and decoded by entropy decoding unit 52. The inverse quantization process may include a conventional process, e.g., as defined by the H.264 decoding standard.

The inverse quantization process may also include use of a quantization parameter QPY calculated by encoder 50 for each 64×64 block to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 54 produces motion compensated blocks, possibly performing interpolation based on interpolation filters. Identifiers for interpolation filters to be used for motion estimation with sub-pixel precision may be included in the syntax elements. Motion compensation unit 54 may use interpolation filters as used by video encoder 50 during encoding of the video block to calculate interpolated values for sub-integer pixels of a reference block. Motion compensation unit 54 may determine the interpolation filters used by video encoder 50 according to received syntax information and use the interpolation filters to produce predictive blocks.

Motion compensation unit 54 uses some of the syntax information to determine sizes of blocks used to encode frame(s) of the encoded video sequence, partition information that describes how each block of a frame of the encoded video sequence is partitioned, modes indicating how each partition is encoded, one or more reference frames (or lists) for each inter-encoded block or partition, and other information to decode the encoded video sequence.

Summer 64 sums the residual blocks with the corresponding prediction blocks generated by motion compensation unit 54 or intra-prediction unit 55 to form decoded blocks. If desired, a deblocking filter may also be applied to filter the decoded blocks in order to remove blockiness artifacts. The decoded video blocks are then stored in reference frame store 62, which provides reference blocks for subsequent motion compensation and also produces decoded video for presentation on a display device (such as device 32 of FIG. 1). The decoded video blocks may each comprise a 64×64 pixel block, 32×32 pixel block, or other larger-than-standard block. Some blocks may include partitions with a variety of different partition sizes.

In HEVC, a coding tree unit (CTU) consists of a luma coding tree block (CTB), the corresponding chroma CTBs, and syntax elements.

A quadtree denoted as the coding tree is used to partition the CTU into multiple coding units (CUs). The root of the quadtree is associated with the CTU. The CTU can be a single CU or can be split into four smaller units of equal sizes of L/2×L/2, which are nodes of coding tree. If units are leaf nodes of coding tree, the units become CUs. Otherwise, the quadtree splitting process can be iterated until the size for a node reaches a minimum allowed CU size specified in the sequence parameter set (SPS).

The size L×L of a luma CTB can be chosen, where L=16, 32, or 64 samples. Here, the width and height are the same.

In an embodiment, an element according to this method is as follows:
log 2_min_luma_coding_block_size_minus3 plus 3 specifies the minimum size of a luma coding block.
log 2_diff_max_min_luma_coding_block_size specifies the difference between the maximum and minimum luma coding block size.

In the document "Block partitioning structure for next generation video coding," by J. An, Y.-W. Chen, K. Zhang, H. Huang, Y.-W. Huang, and S. Lei, ITU-T SG16 Doc. COM16-C966, September 2015, which is incorporated herein by reference, a quad-tree plus binary-tree (QTBT) block partitioning structure is used. The CTU (or CTB) can be partitioned by using quad-tree, binary-tree, or triple-tree.

Figure 4:
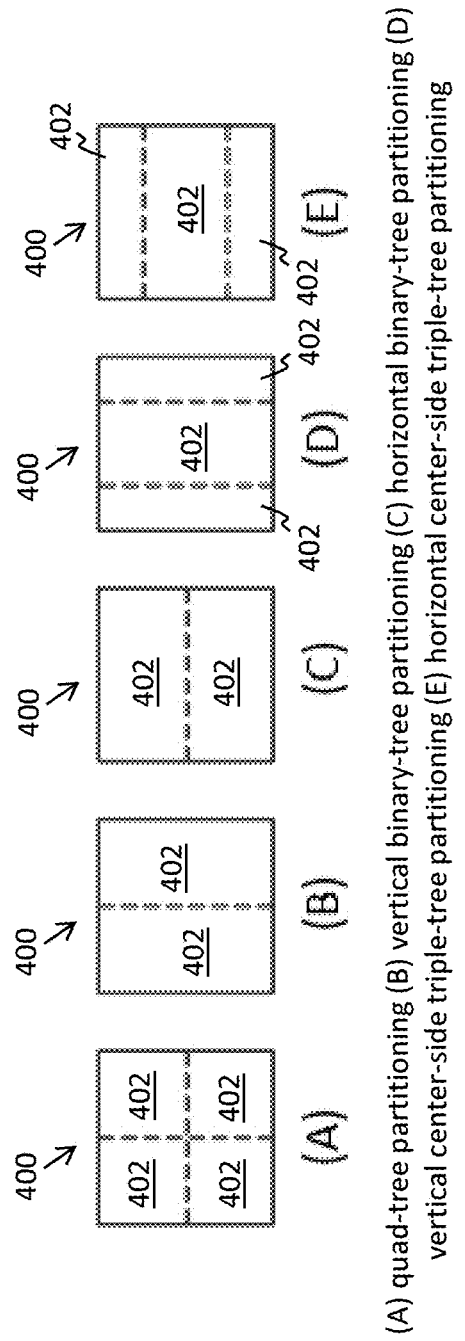
FIGS. 4A-4E collectively illustrate a block (e.g., a CTU) subjected to one of the various partitioning types.

FIGS. 4A-C collectively illustrate a block 400 (e.g., CTUs) subjected to one of the various partitioning types. The block 400 in FIG. 4A has been quad-tree partitioned. As such, the block 400 has been split into four sub-blocks 402. With quad-tree partitioning, a block is split into four sub-blocks, as shown in FIG. 4A. It can be iterated to split until the minimum allowed quad-tree leaf node size is reached.

The blocks 400 in FIGS. 4B-C have been binary-tree partitioned. As such, the blocks have been split into two sub-blocks 402. For binary-tree splitting, there are two splitting types. FIG. 4B illustrates vertical binary-tree partitioning and FIG. 4C illustrates horizontal binary-tree partitioning. Tree types other than quad-tree and binary-tree are supported. For example, vertical center-side triple-tree (TT) partitioning is shown in FIG. 4D, and horizontal center-side TT partitioning is shown in FIG. 4E. In FIGS. 4D-4E, the blocks 400 are split into three of the sub-blocks 402.

In the existing methods, a CTU can be partitioned by using quad-tree, triple-tree and binary-tree so the CTU/block/sub-block can be a square or a rectangle. The present disclosure relates to the syntax of the coding block size.

In the present disclosure, embodiments are described from the perspective of a decoder (e.g., at the decoder side). As such, the input to this process is a bitstream and the output of this process is a list of decoded pictures (a.k.a., an image, a picture, a sequence of images or pictures, etc.).

In a first embodiment, the "block_size" is replaced by "block_width" and "block_height" in the following:

```
log2_min_luma_coding_block_width_minus3
log2_min_luma_coding_block_height_minus3
log2_diff_max_min_luma_coding_block_width
log2_diff_max_min_luma_coding_block_height
log2_min_transform_block_width_minus2
log2_min_transform_block_height_minus2
log2_diff_max_min_transform_block_width
log2_diff_max_min_transform_block_height
```

Figure 5:
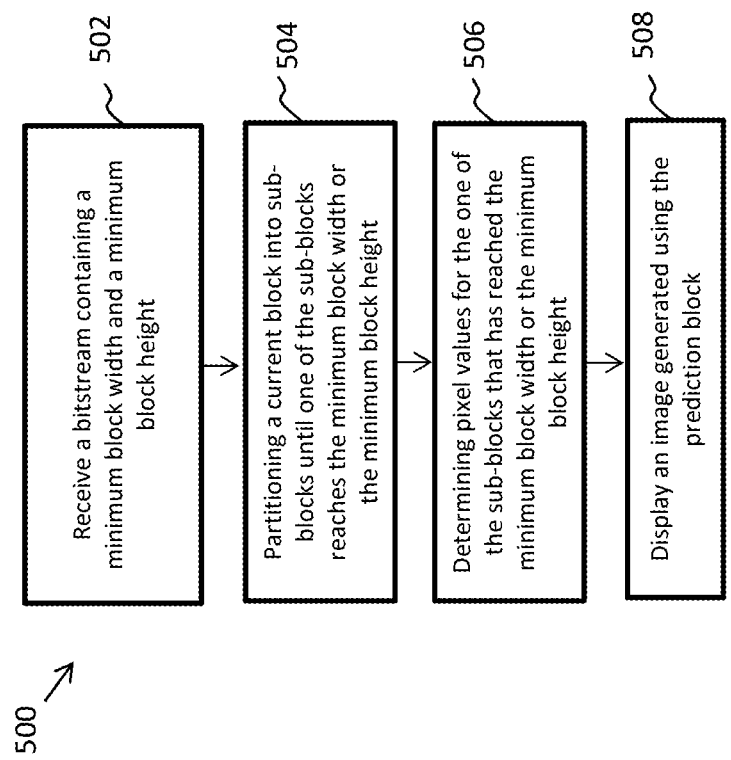
FIG. 5 is an embodiment of a method of coding.

FIG. 5 is a method 500 of coding implemented by a decoding device (e.g., the video decoder 30 of FIG. 3) according to the first embodiment. The method 500 is performed when more efficient video coding is desirable. While the method 500 details steps performed in a decoding device, it should be recognized that one or more of the steps may also be implemented in an encoding device (e.g., the video encoder 20 of FIG. 2).

In block 502, a bitstream containing a minimum block width and a minimum block height is received from an encoding device. In an embodiment, the minimum block width is different than the minimum block height.

In block 504, a current block is partitioned into sub-blocks until one of the sub-blocks reaches the minimum block width or the minimum block height. In an embodiment, the sub-block has a rectangular shape. In an embodiment, the minimum block width specifies a minimum width for a luma coding block and the minimum block height specifies a minimum height for the luma coding block. In an embodiment, the minimum block width is represented as log 2_min_luma_coding_block_width_minus3, and the minimum block height is represented as log 2_min_luma_coding_block_height_minus3.

In block 506, pixel values are determined for the sub-block that has reached the minimum block width or the minimum block height. In an embodiment, the pixel values are determined by the decoding process. That is, when a block (or sub-block) reaches the minimum size (or width or height), further partitioning of the block stops and the pixel deriving process (decoding) process starts. In this process, the bins from bitstream are read and interpreted to pixel values. The bins may be read and interpreted to pixel values as described in the HEVC standard documents previously incorporated by reference above. In block 508, an image generated using the pixel values that were determined is displayed on the display of an electronic device.

In a second embodiment, the "block_size" is replaced by "block_width" or "block_height" and the difference between width and height is used to represent block size in the following:

```
log2_min_luma_coding_block_width_minus3
log2_diff_min_luma_coding_block_width_height
log2_diff_max_min_luma_coding_block_width
log2_diff_max_luma_coding_block_width_height
log2_min_luma_transform_block_width_minus2
log2_diff_min_luma_transform_block_width_height
log2_diff_max_min_luma_transform_block_width
log2_diff_max_luma_transform_block_width_height
```

Figure 6:
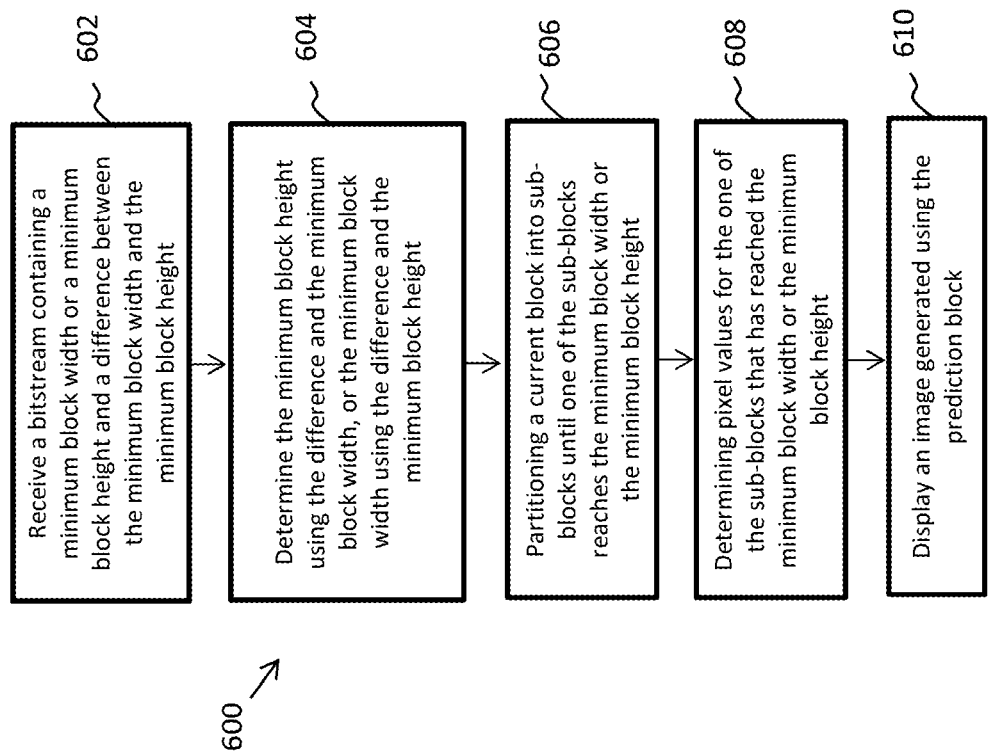
FIG. 6 is an embodiment of a method of coding.

FIG. 6 is a method 600 of coding implemented by a decoding device (e.g., the video decoder 30 of FIG. 3) according to the second embodiment. The method 600 is performed when more efficient video coding is desirable. While the method 600 details steps performed in a decoding device, it should be recognized that one or more of the steps may also be implemented in an encoding device (e.g., the video encoder 20 of FIG. 2).

In block 602, a bitstream containing a minimum block width or a minimum block height is received from an encoding device. The bitstream also includes a difference between the minimum block width and the minimum block height.

In block 604, either the minimum block height is determined using the difference and the minimum block width, or the minimum block width is determined using the difference and the minimum block height. For example, the bitstream may indicate that the minimum block width is 8 and the difference between the minimum block width and the minimum block height is 4. As such, it can be determined that the minimum block height is 4 (e.g., 8−4=4). As another example, the bitstream may indicate that the minimum block height is 4 and the difference between the minimum block width and the minimum block height is 2. As such, it can be determined that the minimum block width is 2 (e.g., 4−2=2).

In block 606, a current block is partitioned into sub-blocks until one of the sub-blocks reaches the minimum block width or the minimum block height. In an embodiment, the minimum block width and the minimum block height each have different values. In an embodiment, the one of the sub-blocks has a rectangular shape. In an embodiment, the minimum block width specifies a minimum width for a luma coding block and the minimum block height specifies a minimum height for the luma coding block. In an embodiment, the difference between the minimum block width and the minimum block height is represented by log 2_diff_min_luma_coding_block_width_height. In an embodiment, the minimum block width is represented as log 2_min_luma_coding_block_width_minus3, and the minimum block height is represented as log 2_min_luma_coding_block_height_minus3.

In block 608, pixel values are determined for the sub-block that has reached the minimum block width or the minimum block height. In block 610, an image generated using the pixel values that were determined is displayed on the display of an electronic device.

In a third embodiment, the "block_size" is replaced by "block_width" or "block_height" and area (e.g., a total number of pixels) is used to represent block size in the following:

```
log2_min_luma_coding_block_width_minus3
log2_diff_min_area_luma_coding_block_size
log2_diff_max_min_luma_coding_block_width
log2_diff_max_area_luma_coding_block_size
log2_min_luma_transform_block_width_minus2
log2_diff_min_area_luma_transform_block_size
log2_diff_max_min_luma_transform_block_width
log2_diff_max_area_luma_transform_block_size
```

Figure 7:
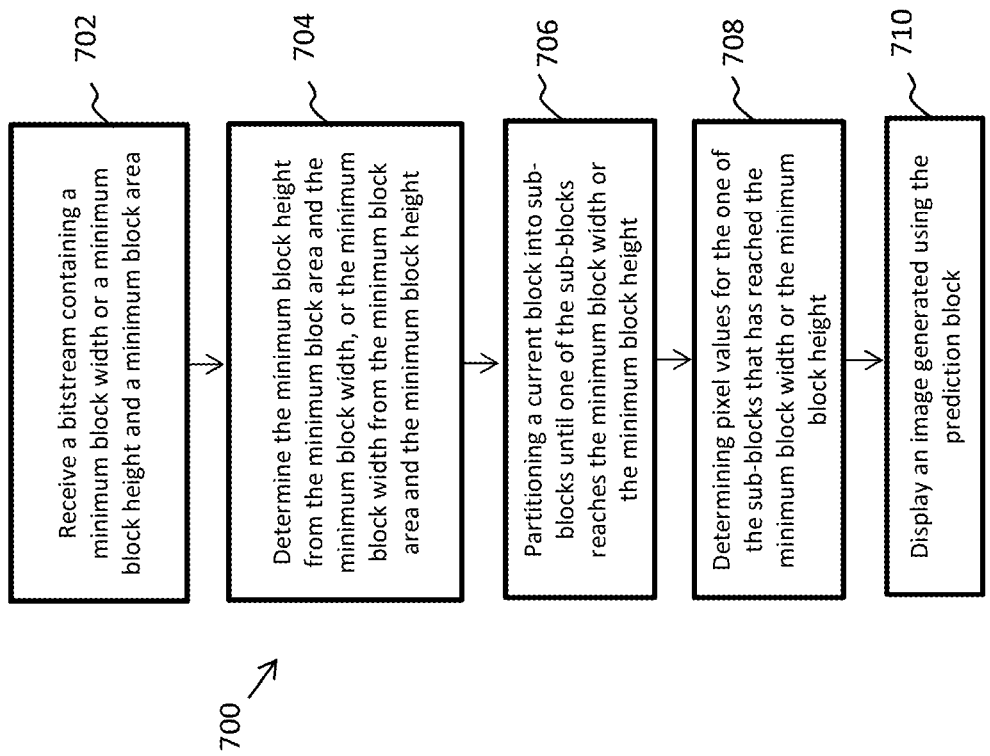
FIG. 7 is an embodiment of a method of coding.

FIG. 7 is a method 700 of coding implemented by a decoding device (e.g., the video decoder 30 of FIG. 3) according to the third embodiment. The method 700 is performed when more efficient video coding is desirable. While the method 700 details steps performed in a decoding device, it should be recognized that one or more of the steps may also be implemented in an encoding device (e.g., the video encoder 20 of FIG. 2).

In block 702, a bitstream containing a minimum block width or a minimum block height is received from an encoding device. The bitstream also includes a minimum block area.

In block 704, either the minimum block height is determined from the minimum block area and the minimum block width, or the minimum block width is determined from the minimum block area and the minimum block height. For example, the bitstream may indicate that the minimum block width is 4 and the minimum block area is 16. As such, it can be determined that the minimum block height is 4 (e.g., 16÷4=4). As another example, the bitstream may indicate that the minimum block height is 8 and the minimum block area is 32. As such, it can be determined that the minimum block width is 4 (e.g., 32÷8=4).

In block 706, a current block is partitioned into sub-blocks until one of the sub-blocks reaches the minimum block width or the minimum block height. In an embodiment, the minimum block width and the minimum block height each have different values. In an embodiment, the one of the sub-blocks has a rectangular shape. In an embodiment, the minimum block area is represented by log 2_diff_min_area_luma_coding_block_size. In an embodiment, the minimum block width is represented as log 2_min_luma_coding_block_width_minus3, and the minimum block height is represented as log 2_min_luma_coding_block_height_minus3.

In block 708, pixel values are determined for the sub-block that has reached the minimum block width or the minimum block height. In block 710, an image generated using the pixel values that were determined is displayed on the display of an electronic device.

Figure 8:
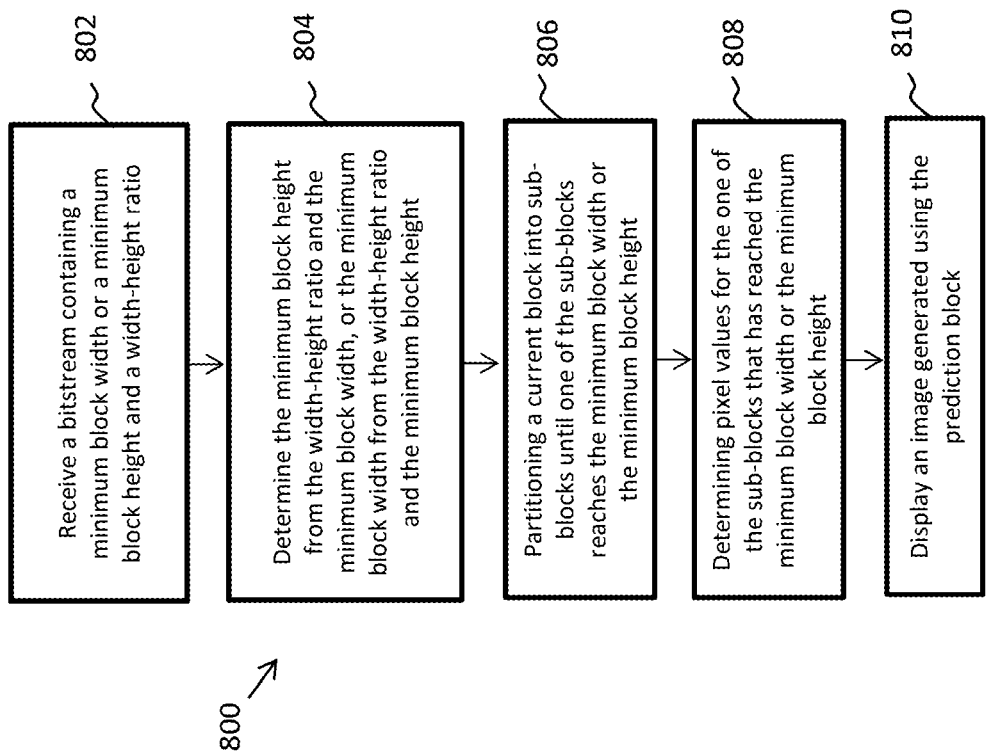
FIG. 8 is an embodiment of a method of coding.

In a fourth embodiment, the "block_size" is replaced by "block_width" or "block_height" and a width-height ratio is used to represent block size in the following:

```
log2_min_luma_coding_block_width_minus3
log2_diff_min_ratio_luma_coding_block_width_height
log2_diff_max_min_luma_coding_block_width
log2_diff_max_ratio_luma_coding_block_width_height
log2_min_luma_transform_block_width_minus2
``` log2_diff_min_ratio_luma_transform_block_width_height
log2_diff_max_min_luma_transform_block_width
log2_diff_max_ratio_luma_transform_block_width_height FIG. 8 is a method 800 of coding implemented by a decoding device (e.g., the video decoder 30 of FIG. 3) according to the fourth embodiment. The method 800 is performed when more efficient video coding is desirable. While the method 800 details steps performed in a decoding device, it should be recognized that one or more of the steps may also be implemented in an encoding device (e.g., the video encoder 20 of FIG. 2).

In block 802, a bitstream containing a minimum block width or a minimum block height is received from an encoding device. The bitstream also includes a width-height ratio.

In block 804, either the minimum block height is determined from the width-height ratio and the minimum block width, or the minimum block width is determined from the width-height ratio and the minimum block height. For example, the bitstream may indicate that the minimum block width is 8 and the width-height ratio is 2-to-1. As such, it can be determined that the minimum block height is 4 (e.g., 8÷2=4). As another example, the bitstream may indicate that the minimum block height is 4 and the width-height ratio is 2-to-1. As such, it can be determined that the minimum block width is 8 (e.g., 4×2=8).

In block 806, a current block is partitioned into sub-blocks until one of the sub-blocks reaches the minimum block width or the minimum block height. In an embodiment, the minimum block width and the minimum block height each have different values. In an embodiment, the one of the sub-blocks has a rectangular shape. In an embodiment, the width-height ratio is represented by log 2_diff_min_ratio_luma_coding_block_width_height.

In block 808, pixel values are determined for the sub-block that has reached the minimum block width or the minimum block height. In block 810, an image generated using the pixel values that were determined is displayed on the display of an electronic device.

Existing solutions use block size indicating the minimum coding block size and maximum coding block. The present disclosure presented block width size and block height size respectively to indicate the coding block size. This method can be used in different shapes of coding block and different partition methods. The syntax elements can be used for any type of block partition, for example, quad tree partition, binary tree partition, asymmetric block partition, triple tree partition, etc. It is also can be used for luma and chroma respectively or both. Thus, the present disclosure provides improvements to the syntax used to code blocks or sub-blocks partitioned using quad-tree, triple-tree, and binary tree so that the CTU, block, and/or sub-blocks, which can be a square or rectangular. As such, the coding device (e.g., video encoder, video decoder) is improved relative to conventional coding devices.

The syntax of width and height, respectively, corresponding to the first embodiment is provided below. The sequence parameter set raw byte sequence payload (RBSP) syntax:

| seq_parameter_set_rbsp( ) { | Descriptor |
|---|---|
| ... | |
| log2_min_luma_coding_block_width_minus3 | ue(v) |
| log2_min_luma_coding_block_height_minus3 | ue(v) |
| log2_diff_max_min_luma_coding_block_width | ue(v) |
| log2_diff_max_min_luma_coding_block_height | ue(v) |
| log2_min_transform_block_width_minus2 | ue(v) |
| log2_min_transform_block_height_minus2 | ue(v) |
| log2_diff_max_min_transform_block_width | ue(v) |
| log2_diff_max_min_transform_block_height | ue(v) |
| ... | |

Syntax elements coded as ue(v) are Exp-Golomb-coded. The parsing process for these syntax elements begins with reading the bits starting at the current location in the bitstream up to and including the first non-zero bit, and counting the number of leading bits that are equal to 0.

log 2_min_luma_coding_block_width_minus3 plus 3 specifies the minimum width of a luma coding block.

log 2_min_luma_coding_block_height_minus3 plus 3 specifies the minimum height of a luma coding block.

log 2_diff_max_min_luma_coding_block_width specifies the difference between the maximum and minimum luma coding block width.

log 2_diff_max_min_luma_coding_block_height specifies the difference between the maximum and minimum luma coding block height.

The variables Min Cb Log 2WidthY, Min Cb Log 2HeightY, Ctb Log 2WidthY, Ctb Log 2HeightY, Min CbWidthY, Min CbHeightY, CtbWidthY, CtbHeightY, PicWidthIn Min CbsY, PicWidthInCtbsY, PicHeightIn Min CbsY, PicHeightInCtbsY, PicSizeIn Min CbsY, PicSizeInCtbsY, PicSizeInSamplesY, PicWidthInSamplesC, and PicHeightInSamplesC are derived as follows.

Min Cb Log 2WidthY=log 2_min_luma_coding_block_width_minus3+3

Min Cb Log 2HeightY=log 2_min_luma_coding_block_height_minus3+3

Ctb Log 2WidthY=Min Cb Log 2WidthY+log 2_diff_max_min_luma_coding_block_width

Ctb Log 2HeightY=Min Cb Log 2HeightY+log 2_diff_max_min_luma_coding_block_height Min CbWidthY=1<<Min Cb Log 2WidthY Min CbHeightY=1<<Min Cb Log 2HeightY CtbWidthY=1<<Ctb Log 2WidthY CtbHeightY=1<<Ctb Log 2HeightY PicWidthIn Min CbsY=pic_width_in_luma_samples/Min CbWidthY PicWidthInCtbsY=Ceil (pic_width_in_luma_samples÷CtbWidthY)

PicHeightIn Min CbsY=pic_height_in_luma_samples/Min CbHeightY

PicHeightInCtbsY=Ceil (pic_height_in_luma_samples÷CtbHeightY)

PicSizeIn Min CbsY=PicWidthIn Min CbsY*PicHeightIn Min CbsY

PicSizeInCtbsY=PicWidthInCtbsY*PicHeightInCtbsY

PicSizeInSamplesY=pic_width_in_luma_samples*pic_height_in_luma_samples

PicWidthInSamplesC=pic_width_in_luma_samples/SubWidthC

PicHeightInSamplesC=pic_height_in_luma_samples/SubHeightC

The variables CtbWidthC and CtbHeightC, which specify the width and height, respectively, of the array for each chroma coding tree block, are derived as follows:

If chroma_format_idc is equal to 0 (monochrome) or separate_colour_plane_flag is equal to 1, CtbWidthC and CtbHeightC are both equal to 0.

Otherwise, CtbWidthC and CtbHeightC are derived as follows:

CtbWidthC=CtbWidthY/SubWidthC
CtbHeightC=CtbHeightY/SubHeightC log 2_min_transform_block_width_minus2 plus 2 specifies the minimum transform block width.

The variable Log 2 Min TrafoWidth is set equal to log 2_min_transform_block_width_minus2+2.

log 2_min_transform_block_height_minus2 plus 2 specifies the minimum transform block height.

The variable Log 2 Min TrafoHeight is set equal to log 2_min_transform_block_height_minus2+2.

log 2_diff_max_min_transform_block_width specifies the difference between the maximum and minimum transform block width.

log 2_diff_max_min_transform_block_height specifies the difference between the maximum and minimum transform block height.

The syntax corresponding to the second embodiment is provided below. In this embodiment, block_width and the difference between width and height are used, for example. In another embodiment, the syntax can be block_height and the difference between width and height. The sequence parameter set RBSP syntax:

| seq_parameter_set_rbsp( ) { | Descriptor |
| --- | --- |
| ... | |
| log2_min_luma_coding_block_width_minus3 | ue(v) |
| log2_diff_min_luma_coding_block_width_height | ue(v) |
| log2_diff_max_min_luma_coding_block_width | ue(v) |
| log2_diff_max_luma_coding_block_width_height | ue(v) |
| log2_min_luma_transform_block_width_minus2 | ue(v) |
| log2_diff_min_luma_transform_block_width_height | ue(v) |
| log2_diff_max_min_luma_transform_block_width | ue(v) |
| log2_diff_max_luma_transform_block_width_height | ue(v) |
| ... | | log 2_min_luma_coding_block_width_minus3 plus 3 specifies the minimum width of a luma coding block.

log 2_diff_min_luma_coding_block_width_height specifies the difference between the minimum width and minimum height of a luma coding block.

log 2_diff_max_min_luma_coding_block_width specifies the difference between the maximum and minimum luma coding block width.

log 2_diff_max_luma_coding_block_width_height specifies the difference between the maximum width and maximum height of a luma coding block.

The variables Min Cb Log 2WidthY, Min Cb Log 2HeightY, Ctb Log 2WidthY, Ctb Log 2HeightY, Min CbWidthY, Min CbHeightY, CtbWidthY, CtbHeightY, PicWidthIn Min CbsY, PicWidthInCtbsY, PicHeightIn Min CbsY, PicHeightInCtbsY, PicSizeIn Min CbsY, PicSizeInCtbsY, PicSizeInSamplesY, PicWidthInSamplesC, and PicHeightInSamplesC are derived as follows:

Min Cb Log 2WidthY=log 2_min_luma_coding_block_width_minus3+3

Min Cb Log 2HeightY=log 2_min_luma_coding_block_width_minus3+3+log 2_diff_min_luma_coding_block_width_height Ctb Log 2WidthY=Min Cb Log 2WidthY+log 2_diff_max_min_luma_coding_block_width Ctb Log 2HeightY=Min Cb Log 2HeightY+log 2_diff_max_luma_coding_block_width_height Min CbWidthY=1<<Min Cb Log 2WidthY
Min CbHeightY=1<<Min Cb Log 2HeightY
CtbWidthY=1<<Ctb Log 2WidthY
CtbHeightY=1<<Ctb Log 2HeightY
PicWidthIn Min CbsY=pic_width_in_luma_samples/Min CbWidthY
PicWidthInCtbsY=Ceil (pic_width_in_luma_samples÷CtbWidthY)
PicHeightIn Min CbsY=pic_height_in_luma_samples/Min CbHeightY
PicHeightInCtbsY=Ceil (pic_height_in_luma_samples÷CtbHeightY)
PicSizeIn Min CbsY=PicWidthIn Min CbsY*PicHeightIn Min CbsY
PicSizeInCtbsY=PicWidthInCtbsY*PicHeightInCtbsY
PicSizeInSamplesY=pic_width_in_luma_samples*pic_height_in_luma_samples
PicWidthInSamplesC=pic_width_in_luma_samples/SubWidthC
PicHeightInSamplesC=pic_height_in_luma_samples/SubHeightC The variables CtbWidthC and CtbHeightC, which specify the width and height, respectively, of the array for each chroma coding tree block, are derived as follows:

If chroma_format_idc is equal to 0 (monochrome) or separate_colour_plane_flag is equal to 1, CtbWidthC and CtbHeightC are both equal to 0.

Otherwise, CtbWidthC and CtbHeightC are derived as follows:

CtbWidthC=CtbWidthY/SubWidthC
CtbHeightC=CtbHeightY/SubHeightC log 2_min_transform_block_width_minus2 plus 2 specifies the minimum transform block width.

The variable Log 2 Min TrafoWidth is set equal to log 2_min_transform_block_width_minus2+2.

log 2_diff_min_luma_transform_block_width_height specifies the difference between minimum width and minimum height of a transform block.

log 2_diff_max_min_luma_transform_block_width specifies the difference between the maximum and minimum width of a transform block.

log 2_diff_max_luma_transform_block_width_height specifies the difference between the maximum width and maximum height of a transform block.

The syntax corresponding to the third embodiment is provided below. In this embodiment, block_width and the block area are used, for example. In another embodiment, the syntax can be block_height and the block area.

The sequence parameter set RBSP syntax:

| seq_parameter_set_rbsp( ) { | Descriptor |
| --- | --- |
| ... | |
| log2_min_luma_coding_block_width_minus3 | ue(v) |
| log2_diff_min_area_luma_coding_block_size | ue(v) |
| log2_diff_max_min_luma_coding_block_width | ue(v) |
| log2_diff_max_area_luma_coding_block_size | ue(v) |
| log2_min_luma_transform_block_width_minus2 | ue(v) |
| log2_diff_min_area_luma_transform_block_size | ue(v) |
| log2_diff_max_min_luma_transform_block_width | ue(v) |
| log2_diff_max_area_luma_transform_block_size | ue(v) | log 2 min_luma_coding_block_width_minus3 plus 3 specifies the minimum width of a luma coding block.

log 2_min_area_luma_coding_block_size specifies the minimum size (number of pixels) of a luma coding block.

log 2_diff_max_min_luma_coding_block_width specifies the difference between the maximum and minimum luma coding block width.

log 2_max_area_luma_transform_block_size specifies the maximum size (number of pixels) of a luma coding block.

The variables Min Cb Log 2WidthY, Min Cb Log 2HeightY, Ctb Log 2WidthY, Ctb Log 2HeightY, Min CbWidthY, Min CbHeightY, CtbWidthY, CtbHeightY, PicWidthIn Min CbsY, PicWidthInCtbsY, PicHeightIn Min CbsY, PicHeightInCtbsY, PicSizeIn Min CbsY, PicSizeInCtbsY, PicSizeInSamplesY, PicWidthInSamplesC, and PicHeightInSamplesC are derived as follows:

Min Cb Log 2WidthY=log 2_min_luma_coding_block_width_minus3+3

Min Cb Log 2HeightY=log 2_min_area_luma_coding_block_size/(log 2_min_luma_coding_block_width_minus3+3)

Ctb Log 2WidthY=Min Cb Log 2WidthY+log 2_diff_max_min_luma_coding_block_width

Ctb Log 2HeightY=log 2_max_area_luma_transform_block_size/(Min Cb Log 2HeightY+log 2_diff_max_luma_coding_block_width)

Min CbWidthY=1<<Min Cb Log 2WidthY

Min CbHeightY=1<<Min Cb Log 2HeightY

CtbWidthY=1<<Ctb Log 2WidthY

CtbHeightY=1<<Ctb Log 2HeightY

PicWidthIn Min CbsY=pic_width_in_luma_samples/Min CbWidthY

PicWidthInCtbsY=Ceil (pic_width_in_luma_samples÷CtbWidthY)

PicHeightIn Min CbsY=pic_height_in_luma_samples/Min CbHeightY

PicHeightInCtbsY=Ceil (pic_height_in_luma_samples÷CtbHeightY)

PicSizeIn Min CbsY=PicWidthIn Min CbsY*PicHeightIn Min CbsY

PicSizeInCtbsY=PicWidthInCtbsY*PicHeightInCtbsY

PicSizeInSamplesY=pic_width_in_luma_samples*pic_height_in_luma_samples

PicWidthInSamplesC=pic_width_in_luma_samples/SubWidthC

PicHeightInSamplesC=pic_height_in_luma_samples/SubHeightC

The variables CtbWidthC and CtbHeightC, which specify the width and height, respectively, of the array for each chroma coding tree block, are derived as follows:

If chroma_format_idc is equal to 0 (monochrome) or separate_colour_plane_flag is equal to 1, CtbWidthC and CtbHeightC are both equal to 0.

Otherwise, CtbWidthC and CtbHeightC are derived as follows:

CtbWidthC=CtbWidthY/SubWidthC

CtbHeightC=CtbHeightY/SubHeightC log 2_min_luma_transform_block_width_minus2 plus 2 specifies the minimum transform block width.

The variable Log 2 Min TrafoWidth is set equal to log 2_min_transform_block_width_minus2+2.

log 2_diff_min_area_luma_transform_block_size specifies the minimum size (number of pixels) of a transform block.

log 2_diff_max_min_luma_transform_block_width specifies the difference between the maximum and minimum width of a transform block.

log 2_diff_max_area_luma_transform_block_size specifies the maximum size (number of pixels) of a transform block.

The syntax corresponding to the fourth embodiment is provided below. In this embodiment, block_width and the ratio of width and height are used, for example. In another embodiment, the syntax can be block_height and the ratio of width and height. The sequence parameter set RBSP syntax:

| seq_parameter_set_rbsp( ) { | Descriptor |
|---|---|
| ... | |
| log2_min_luma_coding_block_width_minus3 | ue(v) |
| log2_diff_min_ratio_luma_coding_block_width_height | ue(v) |
| log2_diff_max_min_luma_coding_block_width | ue(v) |
| log2_diff_max_ratio_luma_coding_block_width_height | ue(v) |
| log2_min_luma_transform_block_width_minus2 | ue(v) |
| log2_diff_min_ratio_luma_transform_block_width_height | ue(v) |
| log2_diff_max_min_luma_transform_block_width | ue(v) |
| log2_diff_max_ratio_luma_transform_block_width_height | ue(v) | log 2 min_luma_coding_block_width_minus3 plus 3 specifies the minimum width of a luma coding block.

log 2_diff_min_ratio_luma_coding_block_width height specifies the ratio of the minimum width and the minimum height of a luma coding block.

log 2_diff_max_min_luma_coding_block_block_width specifies the difference between the maximum and minimum luma coding block width.

log 2_diff_max_ratio_luma_coding_block_width height specifies the ratio of the maximum width and the maximum height of a luma coding block.

The variables Min Cb Log 2WidthY, Min Cb Log 2HeightY, Ctb Log 2WidthY, Ctb Log 2HeightY, Min CbWidthY, Min CbHeightY, CtbWidthY, CtbHeightY, PicWidthIn Min CbsY, PicWidthInCtbsY, PicHeightIn Min CbsY, PicHeightInCtbsY, PicSizeIn Min CbsY, PicSizeInCtbsY, PicSizeInSamplesY, PicWidthInSamplesC, and PicHeightInSamplesC are derived as follows:

Min Cb Log 2WidthY=log 2_min_luma_coding_block_width_minus3+3

Min Cb Log 2HeightY=Min Cb Log 2WidthY/log 2_diff_min_ratio_luma_coding_width_height Ctb Log 2WidthY=Min Cb Log 2WidthY+log 2_diff_max_min_luma_coding_block_width Ctb Log 2HeightY=Ctb Log 2WidthY/log 2_diff_max_ratio_luma_coding_width_height Min CbWidthY=1<<Min Cb Log 2WidthY Min CbHeightY=1<<Min Cb Log 2HeightY CtbWidthY=1<<Ctb Log 2WidthY CtbHeightY=1<<Ctb Log 2HeightY PicWidthIn Min CbsY=pic_width_in_luma_samples/Min CbWidthY PicWidthInCtbsY=Ceil (pic_width_in_luma_samples÷CtbWidthY)

PicHeightIn Min CbsY=pic_height_in_luma_samples/Min CbHeightY

PicHeightInCtbsY=Ceil (pic_height_in_luma_samples÷CtbHeightY)

PicSizeIn Min CbsY=PicWidthIn Min CbsY*PicHeightIn Min CbsY

PicSizeInCtbsY=PicWidthInCtbsY*PicHeightInCtbsY

PicSizeInSamplesY=pic_width_in_luma_samples*pic_height_in_luma_samples

PicWidthInSamplesC=pic_width_in_luma_samples/SubWidthC

PicHeightInSamplesC=pic_height_in_luma_samples/SubHeightC

The variables CtbWidthC and CtbHeightC, which specify the width and height, respectively, of the array for each chroma coding tree block, are derived as follows:

If chroma_format_idc is equal to 0 (monochrome) or separate_colour_plane_flag is equal to 1, CtbWidthC and CtbHeightC are both equal to 0.

Otherwise, CtbWidthC and CtbHeightC are derived as follows:

CtbWidthC=CtbWidthY/SubWidthC
CtbHeightC=CtbHeightY/SubHeightC log 2 min_luma_transform_block_width_minus2 plus 2 specifies the minimum transform block width.

The variable Log 2 Min TrafoWidth is set equal to log 2_min_transform_block_width_minus2+2.

log 2_diff_min_ratio_luma_transform_block_size specifies the ratio of the minimum width and the minimum height of a transform block.

log 2_diff_max_min_luma_transform_block_width specifies the difference between the maximum and minimum width of a transform block.

log 2_diff_max_ratio_luma_coding_block_width_height specifies the ratio of the maximum width and the maximum height of a transform block.

Figure 9:
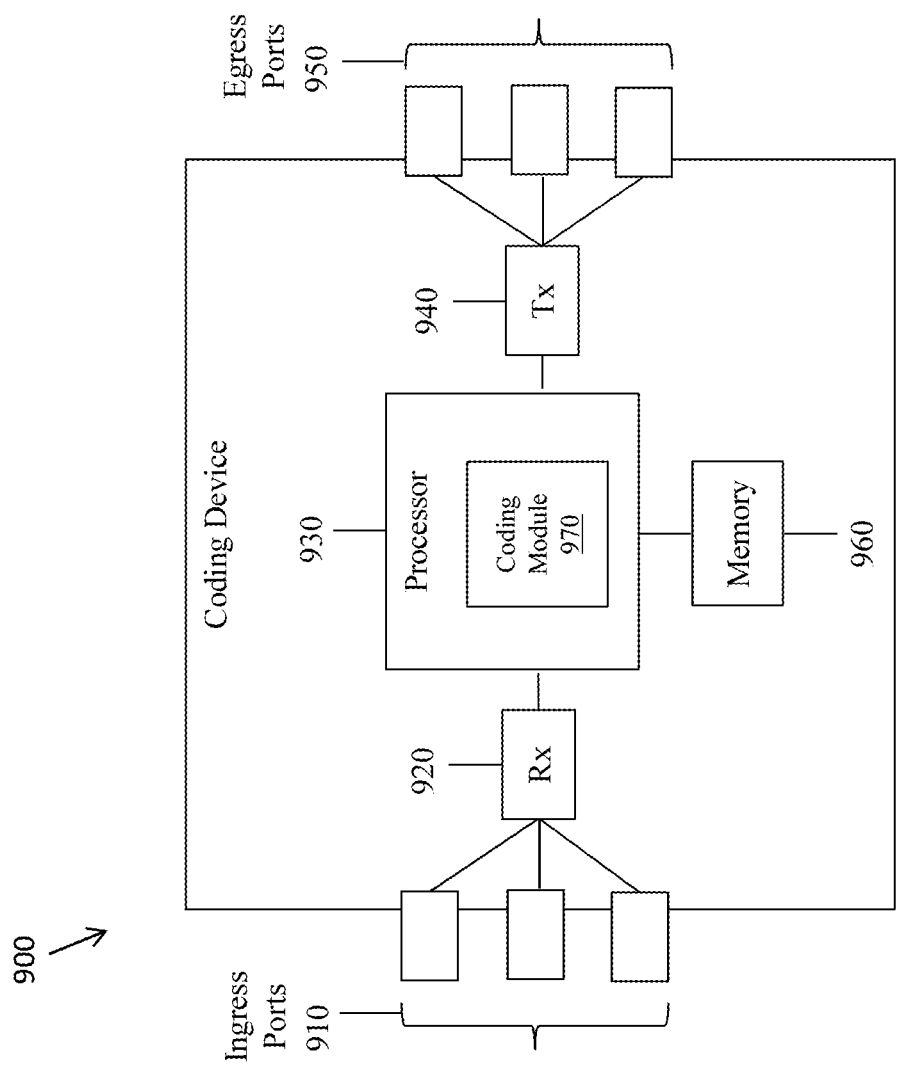
FIG. 9 is a schematic diagram of a network device (e.g., a coding device).

FIG. 9 is a schematic diagram of a network device 900 according to an embodiment of the disclosure. The network device 900 is suitable for implementing the disclosed embodiments as described herein. In an embodiment, the network device 900 may be a decoder or an encoder. The network device 900 comprises ingress ports 910 and receiver units (Rx) 920 for receiving data; a processor, logic unit, or central processing unit (CPU) 930 to process the data; transmitter units (Tx) 940 and egress ports 950 for transmitting the data; and a memory 960 for storing the data. The network device 900 may also comprise optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, receiver units 920, transmitter units 940, egress ports 950, and memory 960. The processor 930 comprises a coding module 970. The coding module 970 implements the disclosed embodiments described above. For instance, the coding module 970 implements, processes, prepares, or provides the various coding operations. The inclusion of the coding module 970 therefore provides a substantial improvement to the functionality of the network device 900 and effects a transformation of the network device 900 to a different state. Alternatively, the coding module 970 is implemented as instructions stored in the memory 960 and executed by the processor 930.

The memory 960 comprises one or more disks, tape drives, and solid-state drives and may be used as an overflow data storage device, to store programs when such programs are selected for execution, and to store instructions and data that are read during program execution. The memory 960 may be volatile and/or non-volatile and may be read-only memory (ROM), random access memory (RAM), ternary content-addressable memory (TCAM), and/or static random-access memory (SRAM).

The following documents referred to herein are incorporated by this reference:

[1] ITU-T Rec. H.265 and ISO/IEC 23008-2 (2013) High efficiency video coding. Final draft approval January 2013 (formally published by ITU-T in June, 2013, and in ISO/IEC in November 2013)

[2] G. J. Sullivan, J.-R. Ohm, W.-J. Han, and T. Wiegand, "Overview of the High Efficiency Video Coding (HEVC) Standard", IEEE Trans. Circuits and Systems for Video Technology, Vol. 22, No. 12, pp. 1649-1668, December 2012.

[3] J. An, Y.-W. Chen, K. Zhang, H. Huang, Y.-W. Huang, and S. Lei, "Block partitioning structure for next generation video coding", ITU-T SG16 Doc. COM16-C966, September 2015.

[4] X. Li et al., Multi-Type-Tree, JVET-D0117, October 2016

Disclosed herein is a method of coding implemented by a decoding means, comprising: receiving, by the decoding means, a bitstream from an encoding means, the bitstream containing a minimum block width and a minimum block height; partitioning, by the decoding means, a current block into sub-blocks until one of the sub-blocks reaches the minimum block width or the minimum block height; determining, by the decoding means, pixel values for the one of the sub-blocks that has reached the minimum block width or the minimum block height; and displaying, on a display means of an electronic means, an image generated using the pixel values that were determined.

Disclosed herein is a method of coding implemented by a decoding means, comprising: receiving, by the decoding means, a bitstream from an encoding means, the bitstream containing: a minimum block width or a minimum block height; and a difference between the minimum block width and the minimum block height; determining, by the decoding means, the minimum block height using the difference and the minimum block width, or the minimum block width using the difference and the minimum block height; partitioning, by the decoding means, a current block into sub-blocks until one of the sub-blocks reaches the minimum block width or the minimum block height; determining, by the decoding means, pixel values for the one of the sub-blocks that has reached the minimum block width or the minimum block height; and displaying, on a display means of an electronic means, an image generated using the pixel values that were determined.

Disclosed herein is a decoding means, comprising: receiving means configured to receive a bitstream, the bitstream containing: a minimum block width or a minimum block height; and a minimum block area; a storage means coupled to the receiving means, the storage means storing instructions; and processing means coupled to the storage means, the processing means configured to execute the instructions stored in the storage means to cause the processing means to: determine the minimum block height from the minimum block area and the minimum block width, or the minimum block width from the minimum block area and the minimum block height; partition a current block into sub-blocks until one of the sub-blocks reaches the minimum block width or the minimum block height; and determine pixel values for the one of the sub-blocks that has reached the minimum block width or the minimum block height; and a display means coupled to the processing means, the display means configured to display an image generated using the pixel values that were determined.

Disclosed herein is a decoding means, comprising: receiving means configured to receive a bitstream, the bitstream containing: a minimum block width or a minimum block height; and a width-height ratio; storage means coupled to the receiving means, the storage means storing instructions; and processing means coupled to the storage means, the processing means configured to execute the instructions stored in the storage means to cause the processing means to: determine the minimum block height from the width-height ratio and the minimum block width, or the minimum block width from the width-height ratio and the minimum block height; partition a current block into sub-blocks until one of the sub-blocks reaches the minimum block width or the minimum block height; and determine pixel values for the one of the sub-blocks that has reached the minimum block width or the minimum block height; and display means coupled to the processing means, the display means configured to display an image generated using the pixel values that were determined.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of coding implemented by a decoding device, comprising:
   receiving, by the decoding device, a bitstream from an encoding device, the bitstream containing a minimum block width and a minimum block height for partitioning a current block;
   partitioning, by the decoding device, the current block into sub-blocks until one of the sub-blocks reaches the minimum block width or the minimum block height;
   determining, by the decoding device, pixel values for the one of the sub-blocks that has reached the minimum block width or the minimum block height; and
   displaying, on a display of an electronic device, an image generated using the pixel values that were determined,
   wherein the minimum block width is represented as log 2_min_luma_coding_block_width_minus3, and the minimum block height is represented as log 2_min_luma_coding_block_height_minus3.

2. The method of claim 1, wherein the minimum block width is different than the minimum block height.

3. The method of claim 1, wherein the one of the sub-blocks has a rectangular shape.

4. The method of claim 1, wherein the minimum block width specifies a minimum width for a luma coding block and the minimum block height specifies a minimum height for the luma coding block.

5. A method of coding implemented by a decoding device, comprising:
   receiving, by the decoding device, a bitstream from an encoding device, the bitstream containing:
   a minimum block width or a minimum block height; and
   a difference between the minimum block width and the minimum block height;
   determining, by the decoding device, the minimum block height using the difference and the minimum block width, or the minimum block width using the difference and the minimum block height;
   partitioning, by the decoding device, a current block into sub-blocks until one of the sub-blocks reaches the minimum block width or the minimum block height;
   determining, by the decoding device, pixel values for the one of the sub-blocks that has reached the minimum block width or the minimum block height; and
   displaying, on a display of an electronic device, an image generated using the pixel values that were determined,
   wherein the minimum block width is represented as log 2_min_luma_coding_block_width_minus3, and the minimum block height is represented as log 2_min_luma_coding_block_height_minus3.

6. The method of claim 5, wherein the minimum block width and the minimum block height each have different values.

7. The method of claim 5, wherein the one of the sub-blocks has a rectangular shape.

8. The method of claim 5, wherein the minimum block width specifies a minimum width for a luma coding block and the minimum block height specifies a minimum height for the luma coding block.

9. The method of claim 5, wherein the difference between the minimum block width and the minimum block height is represented by log 2_diff_min_luma_coding_block_width_height.

10. A decoding device, comprising:
    a receiver configured to receive a bitstream, the bitstream containing:
    a minimum block width or a minimum block height; and
    a minimum block area;
    a memory coupled to the receiver, the memory storing instructions; and
    a processor coupled to the memory, the processor configured to execute the instructions stored in the memory to cause the processor to:
    determine the minimum block height from the minimum block area and the minimum block width, or the minimum block width from the minimum block area and the minimum block height;
    partition a current block into sub-blocks until one of the sub-blocks reaches the minimum block width or the minimum block height; and
    determine pixel values for the one of the sub-blocks that has reached the minimum block width or the minimum block height; and
    a display coupled to the processor, the display configured to display an image generated using the pixel values that were determined,
    wherein the minimum block width is represented as log 2_min_luma_coding_block_width_minus3, and the minimum block height is represented as log 2_min_luma_coding_block_height_minus3.

11. The decoding device of claim 10, wherein the minimum block width and the minimum block height each have different values.

12. The decoding device of claim 10, wherein the one of the sub-blocks has a rectangular shape.

13. The decoding device of claim 10, wherein the minimum block area is represented by log 2_diff_min_area_luma_coding_block_size.

14. A decoding device, comprising:
- a receiver configured to receive a bitstream, the bitstream containing:
  - a minimum block width or a minimum block height; and
  - a width-height ratio;
- a memory coupled to the receiver, the memory storing instructions; and
- a processor coupled to the memory, the processor configured to execute the instructions stored in the memory to cause the processor to:
  - determine the minimum block height from the width-height ratio and the minimum block width, or the minimum block width from the width-height ratio and the minimum block height;
  - partition a current block into sub-blocks until one of the sub-blocks reaches the minimum block width or the minimum block height; and
  - determine pixel values for the one of the sub-blocks that has reached the minimum block width or the minimum block height; and
- a display coupled to the processor, the display configured to display an image generated using the pixel values that were determined, wherein the width-height ratio is represented by log 2_diff_min_ratio_luma_coding_block_width_height.

15. The decoding device of claim 14, wherein the minimum block width and the minimum block height each have different values.

16. The decoding device of claim 14, wherein the one of the sub-blocks has a rectangular shape.

* * * * *